United States Patent
El Defrawy et al.

(10) Patent No.: US 10,425,489 B1
(45) Date of Patent: Sep. 24, 2019

(54) INFERRING NETWORK SERVICES AND THEIR DEPENDENCIES FROM HEADER AND FLOW DATA AND THE SWITCHING TOPOLOGY

(71) Applicant: HRL Laboratories, LLC, Malibu, CA (US)

(72) Inventors: Karim El Defrawy, Santa Monica, CA (US); Ian A. Maxon, Sunland, CA (US); Matthew S. Keegan, Boston, MA (US); Tsai-Ching Lu, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 554 days.

(21) Appl. No.: 15/216,457

(22) Filed: Jul. 21, 2016

Related U.S. Application Data

(60) Provisional application No. 62/195,225, filed on Jul. 21, 2015, provisional application No. 62/286,306, filed on Jan. 22, 2016.

(51) Int. Cl.
*G06F 15/16* (2006.01)
*H04L 29/08* (2006.01)
*H04L 12/24* (2006.01)

(52) U.S. Cl.
CPC ............ *H04L 67/16* (2013.01); *H04L 41/12* (2013.01); *H04L 67/30* (2013.01)

(58) Field of Classification Search
CPC .......... H04L 67/16; H04L 41/12; H04L 67/30
USPC ....................................................... 709/224
See application file for complete search history.

(56) References Cited

U.S. PATENT DOCUMENTS

| | | | | |
|---|---|---|---|---|
| 8,938,532 B2 * | 1/2015 | Terrell | ................ | H04L 41/5009 709/224 |
| 8,958,297 B1 * | 2/2015 | Miller | ..................... | H04L 47/22 370/235 |
| 9,143,552 B2 * | 9/2015 | Bonner | ................... | H04L 67/06 |
| 9,172,611 B2 * | 10/2015 | Guruswamy | ........... | H04L 41/12 |
| 9,294,354 B2 * | 3/2016 | Kumar | ............... | G06F 17/5068 |
| 9,332,026 B2 * | 5/2016 | Lapsley | ................. | H04L 63/08 |
| 9,621,431 B1 * | 4/2017 | Cardente | ................ | H04L 41/12 |
| 9,667,521 B2 * | 5/2017 | Pietrowicz | ............ | H04L 43/106 |
| 9,699,109 B1 * | 7/2017 | Sait | ..................... | G06F 9/45558 |
| 9,781,004 B2 * | 10/2017 | Danait | .................. | H04L 41/142 |
| 9,912,546 B2 * | 3/2018 | Chart | ...................... | H04L 41/12 |

(Continued)

OTHER PUBLICATIONS

Krugel, Christopher et al. "Service Specific Anomaly Detection for Network Intrusion Detection," Proceedings of the 2002 ACM Symposium on Applied Computing (SAC), Mar. 14, 2002, pp. 201-208. (Year: 2002).*

(Continued)

*Primary Examiner* — Melvin H Pollack
(74) *Attorney, Agent, or Firm* — Tope-McKay & Associates

(57) ABSTRACT

Described is system for inferring networks service dependencies. The system detects a set of network services from a set of network data. The system additionally detects a set of network service profiles in the set of network data. A network switching topology of the network is then determined. Finally, network service dependencies are inferred by analyzing a dependency structure of the network using at least one of the set of network services, the set of network service profiles, and the network topology.

12 Claims, 6 Drawing Sheets

(56) References Cited

U.S. PATENT DOCUMENTS

| | | | | |
|---|---|---|---|---|
| 9,917,751 | B2* | 3/2018 | Sasturkar | H04L 43/045 |
| 10,042,722 | B1* | 8/2018 | Chigurupati | G06F 11/1423 |
| 10,142,353 | B2* | 11/2018 | Yadav | H04L 43/04 |
| 2016/0119437 | A1* | 4/2016 | Sylla | H04L 67/16 709/224 |
| 2016/0359697 | A1* | 12/2016 | Scheib | H04L 63/1425 |
| 2017/0126512 | A1* | 5/2017 | Seed | H04L 41/5045 |
| 2018/0367466 | A1* | 12/2018 | Shear | H04L 47/70 |

OTHER PUBLICATIONS

Mukherjee, B. et al. "Network Intrusion Detection," IEEE Network, vol. 8, Issue 3, May-Jun. 1994, pp. 26-41. (Year: 1994).*

Held, Albert et al. "Modeling of Context Information for Pervasive Computing Applications," Proceedings of SCI, 2002. (Year: 2002).*

Chen, Xu, et al. "Automating Network Application Dependency Discovery: Experiences, Limitations, and New Solutions." OSDI. vol. 8. 2008, pp. 1-14.

Kandula, Srikanth, Ranveer Chandra, and Dina Katabi. "What's going on?: learning communication rules in edge networks." ACM SIGCOMM Computer Communication Review 38.4 (2008): pp. 87-98.

Bahl, Paramvir, et al. "Towards highly reliable enterprise network services via inference of multi-level dependencies." ACM SIGCOMM Computer Communication Review. vol. 37, No. 4. ACM, 2007, pp. 13-24.

Popa, Lucian, et al. "Microscope: end-point approach to networked application dependency discovery." Proceedings of the 5th international conference on Emerging networking experiments and technologies. ACM, 2009, pp. 229-240.

Fonseca, Rodrigo, et al. "X-trace: A pervasive network tracing framework."Proceedings of the 4th USENIX conference on Networked systems design & implementation. USENIX Association, 2007, pp. 271-284.

Barham, Paul, et al. "Constellation: automated discovery of service and host dependencies in networked systems." TechReport, MSR-TR-2008-67 (2008), pp. 1-14.

Brown, Aaron, Gautam Kar, and Alexander Keller. "An active approach to characterizing dynamic dependencies for problem determination in a distributed environment." Integrated Network Management Proceedings, 2001 IEEE/IFIP International Symposium on. IEEE, 2001, pp. 377-390.

Marshall, Scott. "CANDID: Classifying Assets in Networks by Determining Importance and Dependencies." (2013), pp. 0-83.

Natarajan, Arun, et al. NSDMiner: Automated Discovery of Network Service Dependencies. IEEE, INFOCOM, 2012, pp. 2507-2515.

Peddycord III, Barry et al. "On the Accurate Identification of Network Service Dependencies in Distributed Systems." USENIX Association 26th Large Installation System Administration Conference (LISA '12), pp. 181-194, 2012.

Kelly, et al., "CANDID: Comparison Algorithm for Navigating Digital Image Databases," Computer Research and Applications Group, CIC-3, Los Alamos National Laboratory, Los Alamos, NM, 87545, 1994, pp. 252-258.

Natarajan, Arun, et al. NSDMiner: Automated Discovery of Network Service Dependencies. IEEE, 2012, pp. 2507-2515.

Chen, Xu, et al. "Automating Network Application Dependency Discovery: Experiences, Limitations, and New Solutions." OSDI. vol. 8. 2008, pp. 117-130.

Popa, Lucian, et al. "Macroscope: end-point approach to networked application dependency discovery." Proceedings of the 5th international conference on Emerging networking experiments and technologies. ACM, 2009, pp. 229-240.

Marshall, Scott. "CANDID: Classifying Assets in Networks by Determining Importance and Dependencies," 2013, pp. 1-83.

Ganter, B. & Wille, R. 1998. Formal Concept Analysis: Mathematical Foundations. Springer-Verlag, Chapter 1.

Carpineto, C. & Romano, G. 2004. Concept Data Analysis: Theory and Applications. Wiley, Chapter 2.

Ganter, B. & Wille, R. 1989. Conceptual Scaling. In: F. Roberts (ed.) Applications of combinatorics and graph theory to the biological and social sciences, pp. 139-167. Springer, New York.

Wolff, K.E. States, Transitions, and Life Tracks in Temporal Concept Analysis. Lecture Notes in Computer Science. V 3626, pp. 127-148, 2005.

Wolff, K.E. (2001) Temporal Concept Analysis. In: E. Mephu Nguilo et al (eds.): ICCS2001 International Workshop on Concept Lattice-Based Theory, Methods and Tools for Knowledge Discovery in Databases, Stanford University, Palo Alto, pp. 91-107.

Wolff, K.E. Concepts, States, and System& In: Dubois, D.M. (eds): Computing Anticipatory Systems. CASYS'99 —Third international Conference, Liege, Belgium, 1999, American Institute of Physics Conference Proceedings 517, 2000, pp. 83-97.

Kuznetsov S., Obiedkov S. Comparing Performance of Algorithms for Generating Concept Lattices, 14, Journal of Experimental and Theoretical Artificial Intelligence, Taylor & Francis, pp. 189-216, 2002.

Stumme G., Taouil R., Bastide Y., Pasquier N., Lakhal L. Fast Computation of Concept Lattices Using Data Mining Techniques. Proc. 7th Int. Workshop on Knowledge Representation Meets Databases (KRDB 2000), pp. 129-139, 2000.

Van der Merwe D, Obiedkov S., Kourie D. AddIntent: A New Incremental Algorithm for Constructing Concept Lattices, In: Proceedings of the 2nd International Conference on Formal Concept Analysis (ICFCA 2004). "Concept Lattices, Proceedings", Lecture Notes in Artificial Intelligence, vol. 2961, pp. 372-385, 2004.

* cited by examiner

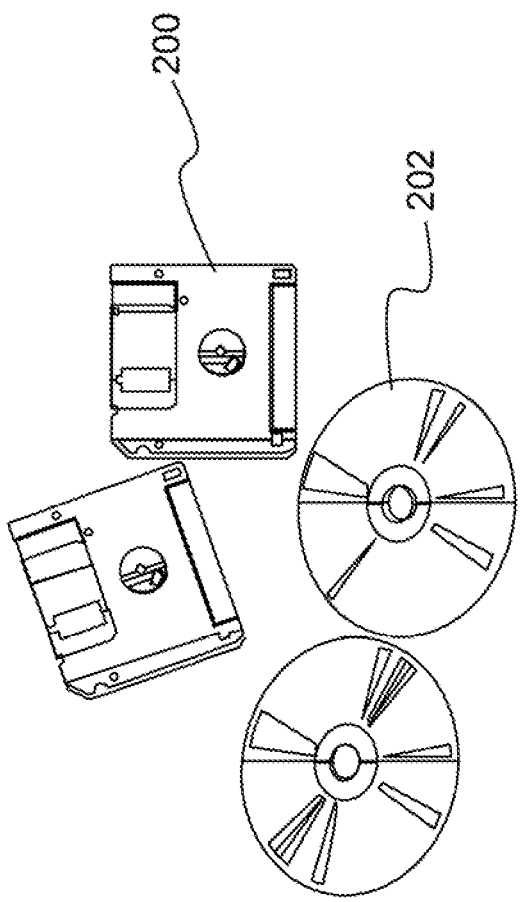

| Approach | Local-Remote Dependencies | Remote-Remote Dependencies | Unobservable Links | Host/Network Based | Active Perturbation | Application Specific | Topology Info |
|---|---|---|---|---|---|---|---|
| NSDMiner | Yes | No | No | Network | No | No | No |
| eXpose | Yes | Yes | No | Network | No | No | No |
| Orion | Yes | Yes | No | Host | No | No | No |
| Sherlock | No | Yes | No | Host | No | No | No |
| Macroscope | Yes | Yes | No | Host | No | Yes | No |
| Constellation | Yes | Yes | No | Host | No | No | No |
| X-Trace | Yes | Yes | No | Network | No | Yes | No |
| ADD | Yes | Yes | No | Network | Yes | Yes | No |
| CANDID | Yes | No | No | Network | No | No | No |
| CyberSNAP | Yes | No | Yes | No | No | No | Yes |

(PRIOR ART)

FIG. 3

INFERRING NETWORK SERVICES AND THEIR DEPENDENCIES FROM HEADER AND FLOW DATA AND THE SWITCHING TOPOLOGY

CROSS-REFERENCE TO RELATED APPLICATIONS

This is a Non-Provisional application of U.S. Non-Provisional Application No. 62/195,225, filed in the United States on Jul. 21, 2015, entitled, "Inferring Network Services and their Dependencies from Header and Flow Data and the Switching Topology," which is incorporated herein by reference in its entirety.

This is also a Non-Provisional Application of U.S. Provisional Patent Application No. 62/286,306, filed in the United States on Jan. 22, 2016, entitled, "Lattice-Based Inference of Network Services and their Dependencies from Header and Flow Data," the entirety of which is hereby incorporated by reference as though fully set forth herein.

BACKGROUND OF INVENTION

(1) Field of Invention

The present invention relates to a system for inferring network service dependencies and, more particularly, to a system for inferring network service dependencies using flow data and the underlying network topology,

(2) Description of Related Art

A network service is an application running at the network application layer and above that provides data storage, manipulation, presentation, and communication. Network services often depend on one another to provide and support network-based services and applications. Detecting and understanding network service dependencies is significant to maintaining the proper function of a network and its applications, especially in the presence of network attacks and failures (see the List of Incorporated Literature References, Literature Reference No. 1).

There are tools for network service dependency detection, but they all have disadvantages and shortcomings, which are described in Literature Reference No. 1. Many of the tools do not use all of the data that is likely available to aid their search and analysis, and most do not fully consider the interactions between more than two services, such as network profiles. Network profiles are collections of properties that determine how the network is configured and how it operates based on current network conditions.

One shortcoming typically found in passive dependency inference is the presence of "blind spots", which is the traffic in a network that does not pass through anywhere that has packet or flow collection. Examples of algorithms and programs using the family of passive dependency detection algorithms include NSDMiner (described in Literature Reference No. 1), eXpose (described in Literature Reference No. 3), Orion, and many others.

NSDMiner (see Literature Reference No. 1) has a limited form of service profile detection with its similarity and clustering features. However, both of these features are intended for other purposes. The clustering feature's main purpose is to reduce the number of duplicate rules that occur when a service is load balanced or mirrored between multiple internet protocol (IP) addresses, and not to identify groups of services that tightly depend on each other to perform some action. The similarity feature's purpose is to weight infrequently used services that are similar to a well-used service so that the infrequent service is not pruned. eXpose (see Literature Reference No. 3) uses patterns for its dependency detection. However expose is similar to NSDMiner in that it only considers pairs of services, not chains, and it does not attempt to use patterns to infer unobservable dependencies.

The table in FIG. 3 summarizes approaches for network service dependency detection. "Local-remote dependencies" are dependencies in which a client relies on a mix of services in the local network and remote services outside of the observable network. "Remote-remote dependencies" are ones in which a client depends on two or more services outside of the observed network, and these services in some way rely on each other (e.g., WWW (World Wide Web) needing an external domain name system (DNS) server). "Unobservable links" refers to the ability of an approach to compensate for blind spots in the network observations. "Host/network based" approaches are ones that require modification of each host on the network to function properly. "Active perturbation" refers to techniques that actively insert traffic into the network to better determine the dependencies. "Application specific" approaches are ones that operate at least partially above Layer 3 (network layer). Finally, "topology info" refers to techniques that take into consideration the Layer 2 (data link layer) topology and observability of the network.

Thus, a continuing need exists for a system that can alleviate blind spot weaknesses and use prior observations and user input to improve accuracy and utility of data in network service dependency detection.

SUMMARY OF THE INVENTION

The present invention relates to a system for inferring network service dependencies and, more particularly, to a system for inferring network service dependencies using flow data and the underlying network topology. The system comprises one or more processors and a memory having instructions such that when the instructions are executed, the one or more processors perform multiple operations. The system detects a set of network services from a set of network data. The system further detects a set of network service profiles in the set of network data and determines a network switching topology of the network. Finally, the system infers network service dependencies by analyzing a dependency structure of the network using at least one of the set of network services, the set of network service profiles, and the network topology.

In another aspect, a plurality of unobservable dependencies in the network are inferred using the set of network service profiles.

In another aspect, a plurality of known dependencies in the set of network services detected are pruned using the network topology of the network.

In another aspect, an effect of blind spots in the set of network data is mitigated.

In another aspect, the system continuously detects new network service dependencies; compares the new network service dependencies to previously detected network service dependencies; and detects at least one of network attacks and deviations from normal operations of the network.

In another aspect, the present invention also comprises a method for causing a processor to perform the operations described herein and performing the listed operations.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 2 is an illustration of a computer program product according to embodiments of the present disclosure;

FIG. 3 is a table of network service dependency detection approaches according to the prior art;

DETAILED DESCRIPTION

Figure 1:
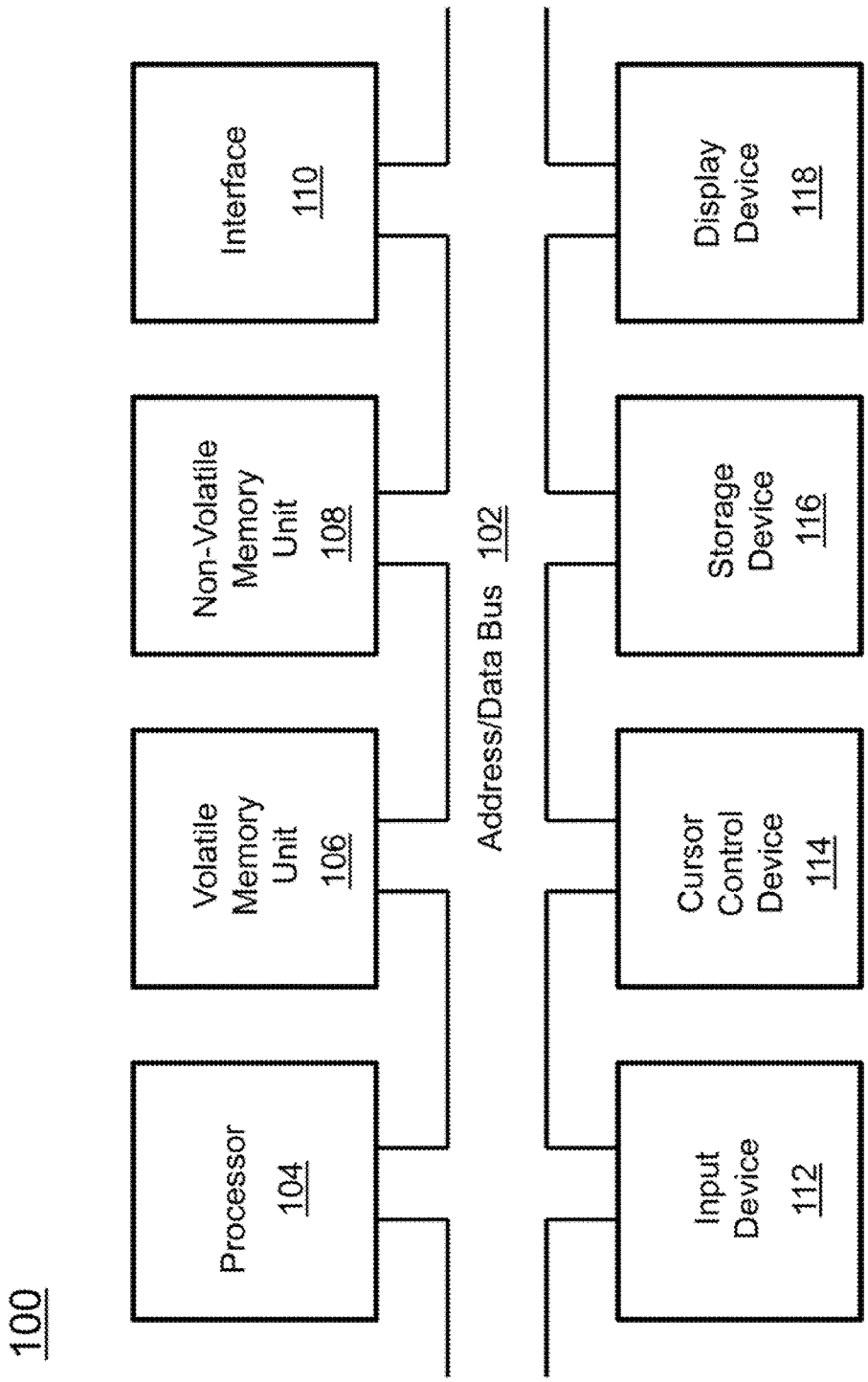
FIG. 1 is a block diagram depicting the components of a system for inferring network service dependencies according to embodiments of the present disclosure.

The present invention relates to a system for inferring network service dependencies and, more particularly, to a system for inferring network service dependencies using flow data and the underlying network topology. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited literature references used in the description is provided. Next, a description of various principal aspects of the present invention is provided. Finally, specific details of the present invention are provided to give an understanding of the specific aspects.

(1) LIST OF INCORPORATED LITERATURE REFERENCES

The following references are incorporated and cited throughout this application. For clarity and convenience, the references are listed herein as a central resource for the reader. The following references are hereby incorporated by reference as though fully included herein. The references are cited in the application by referring to the corresponding literature reference number, as follows:

1. Natarajan, Arun, et al. NSDMiner: Automated Discovery of Network Service Dependencies. IEEE, 2012.
2. Chen, Xu, et al. "Automating Network Application Dependency Discovery: Experiences, Limitations, and New Solutions." OSDI. Vol. 8. 2008.
3. Kandula, Srikanth, Ranveer Chandra, and Dina Katabi. "What's going on?: learning communication rules in edge networks." ACM SIGCOMM Computer Communication Review 38.4 (2008): 87-98.
4. Bahl, Paramvir, et al. "Towards highly reliable enterprise network services via inference of multi-level dependencies." ACM SIGCOMM Computer Communication Review. Vol. 37. No. 4. ACM, 2007.
5. Popa, Lucian, et al. "Macroscope: end-point approach to networked application dependency discovery." Proceedings of the 5th international conference on Emerging networking experiments and technologies. ACM, 2009.
6. Fonseca, Rodrigo, et al. "X-trace: A pervasive network tracing framework. "Proceedings of the 4th USENIX conference on Networked systems design & implementation." USENIX Association, 2007.
7. Barham, Paul, et al. "Constellation: automated discovery of service and host dependencies in networked systems." TechReport, MSR-TR-2008-67, 2008.
8. Brown, Aaron, Gautam Kar, and Alexander Keller. "An active approach to characterizing dynamic dependencies for problem determination in a distributed environment." Integrated Network Management Proceedings, 2001 IEEE/IFIP International Symposium on. IEEE, 2001.
9. Marshall, Scott. "CANDID: Classifying Assets in Networks by Determining Importance and Dependencies," 2013.
10. Peddycord III, Barry et al. "On the Accurate Identification of Network Service Dependencies in Distributed Systems." USENIX Association 26th Large Installation System Administration Conference (LISA '12), 181-194, 2012.

(2) PRINCIPAL ASPECTS

Various embodiments of the invention include three "principal" aspects. The first is a system for building a concept lattice. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of the Invention

Described is a system that automatically detects network services and establishes dependencies between the network services given certain types of input (e.g., packet headers, netflow-like data) that would be readily available to a network administrator. The approach is passive; in other words, it does not require any injection of traffic or delays and also does not require deployment of any monitoring software at any servers or host nodes. A network service is a process running on a computer in a network that listens on a port for connections from client processes running on other computers, and provides a service over the network (see Literature Reference No. 10).

In one embodiment, the system according to embodiments of the present disclosure identifies existing service profiles as an internet protocol (IP), transmission control procedure (TCP)/user datagram protocol (UDP) port tuple. In another embodiment, the system finds clusters, or chains, of network services that are temporally correlated in a particular pattern. In yet another embodiment, the system uses a switching topology of a network to constrain the set of possible dependencies given a set of observation points and servers, discover interactions that may be recorded more than once, and help dependency detection algorithms by constraining the possible number of service dependencies. In another embodiment, the invention uses the existing service profiles identified to infer unobservable dependencies by considering partial service profiles that appear to have pieces of them contained in regions of the network that are not visible (e.g., a missing link), but correlate with a similar profile that was fully visible or known from prior knowledge.

Figure 4:
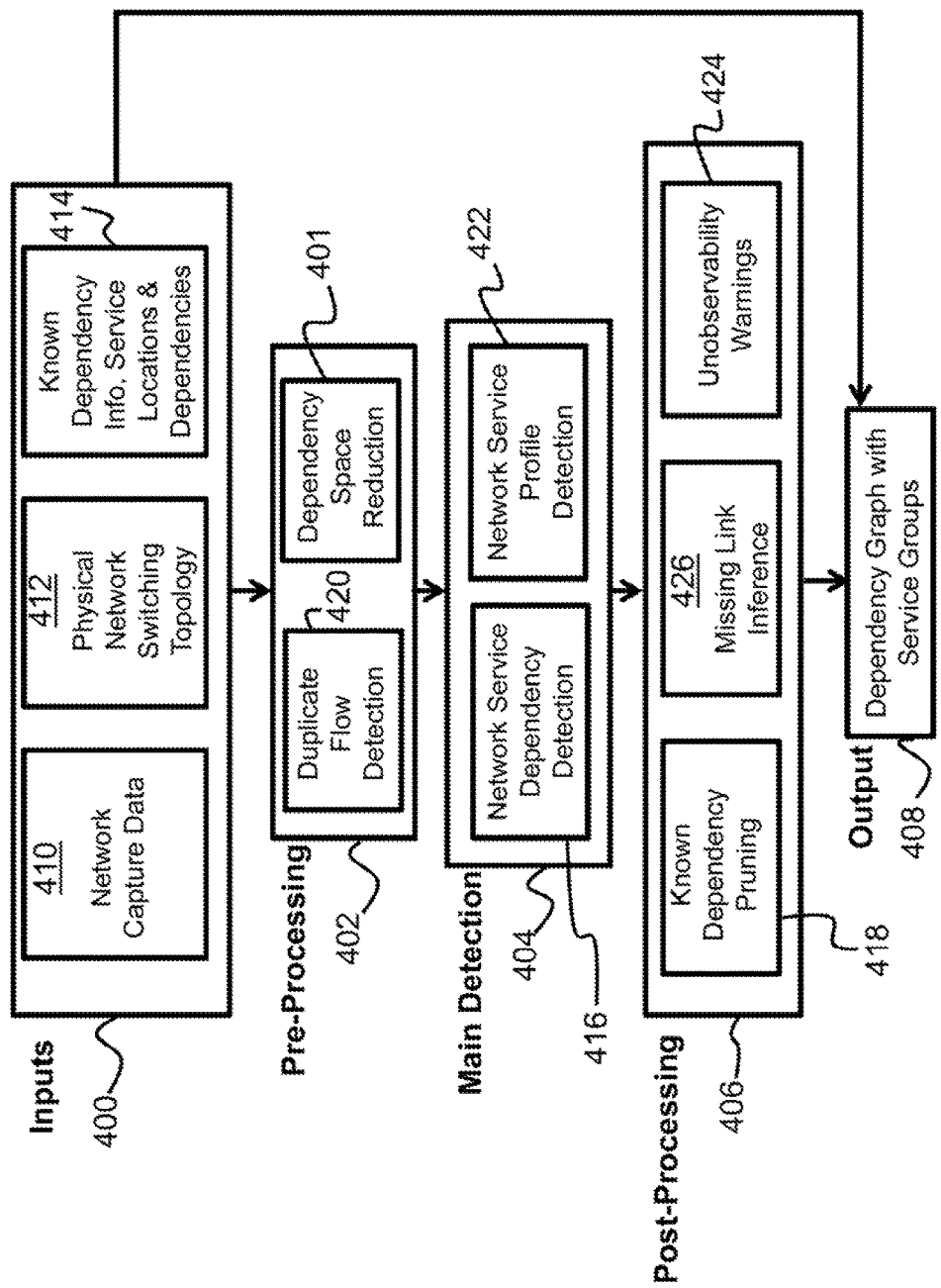
FIG. 4 is an illustration of network analysis according to embodiments of the present disclosure.

A block diagram of network analysis according to embodiments of the present disclosure is illustrated in FIG. 4. The network analysis is divided into an input process 400, a pre-processing process 402, a main detection process 404, a post-processing process 406, and an output process 408. In a non-limiting example, an internet protocol (IP)-based network with services that are easily identified by a 2-tuple of (I.P, port) is analyzed. The inputs (element 400) from this notional network used in the present invention to illustrate the sets of algorithms are described. The main input (element 400) for the main detection process 404 according to some embodiments of this disclosure is flow data (or packet headers, depending on the algorithm's requirements), also referred to as network capture data 410. Flows are a summary of a group of packets based on the idea of a conversation between computers (i.e., derived from packet headers) either as they occur, or later based on recorded packet headers. The system described herein can use flows or derive flows from packet traces.

A non-limiting example of a flow record is in the following space-delimited format is as follows:

| start | end | duration | proto | srcip | srcport | dstip | dstport | size | flags |
|---|---|---|---|---|---|---|---|---|---|
| 1371858682.970 | 1371859947.96 | 1264.126 | UDP | | | 192.168.56.100 | | 59399 | |
| | 66.241.101.63 | 123 | | ... | ... | 82 | 6232 | 2 | |

Figure 5:
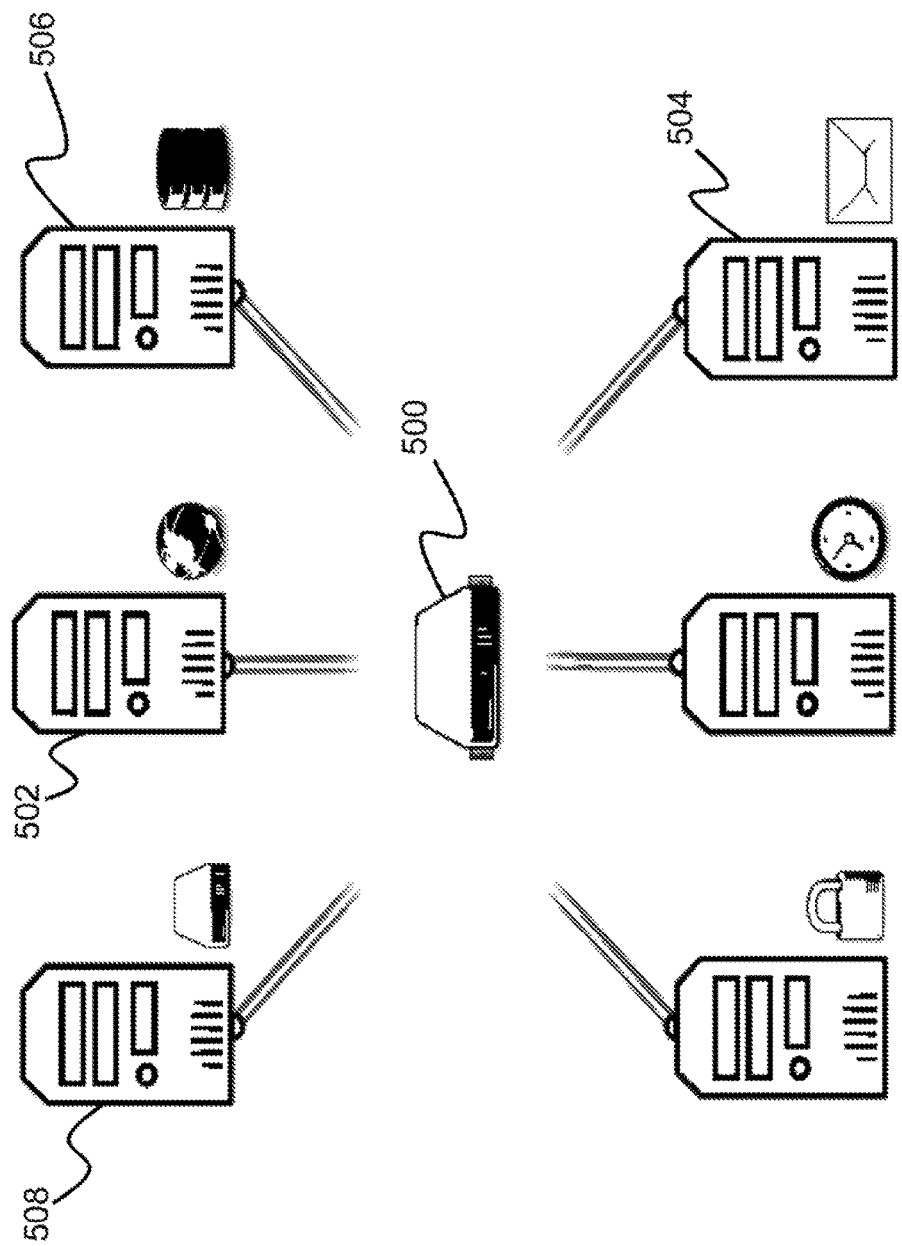
FIG. 5 is an illustration of a network topology according to embodiments of the present disclosure.

An additional input (element 400) for the main detection process 404 is a spanning tree representing the physical network switching topology 412 of the network that the flow data has been collected on. Nodes represent any network device at the link (or medium access control, MAC) layer, but should also have an IP address if the device is also part of the IP network (such as end-hosts and routers). A non-limiting example of a physical network switching topology 412, specifically a simple-1 switch network topology, is shown in FIG. 5, where a network switch 500 and a plurality of nodes of the network (e.g., web server 502, email server 504, database server 506, DNS (domain name server) server 508) are depicted.

Furthermore, locations where the main input (flow data/packet headers) are collected within the switching tree and locations where services known to administrators are located are inputs (i.e., known dependency information, service locations, and dependencies 414) for the main detection process 404. This information is typically readily available and easy to find.

Given the inputs (element 400), the following steps are taken to build the dependency network. A passive network service dependency detection process 416 is run on the flow or packet header data. Algorithm 1 below demonstrates such an approach that combines both algorithms from NSDMiner (see Literature Reference No. 1) and CANDID.

Algorithm 1: Network Service Dependency Detection (Element 416 in FIG. 4)

```
oldest_tstamp = flows[0][start]
parent_flows = [ ]
hits = {flow:count}
for f in flows:
    for p in parents:
        if p[start]<oldest_tstamp:
            parents.delete(p)
            continue
        if p.contains(f):
            hits[p] +=1
            oldest_tstamp = p[start]
    parents.add(f)
```

This will generate a list of dependency edges, such as in Text 2 below (a CyberSNAP text output), which represents a directed graph. The first line in Text 2 is a detected service, and each entry under the first lines is a discovered dependency of the detected service. This can be used in the subsequent algorithms described below.

Text 2:

| 192.168 56.100:53:UDP 100 | | |
|---|---|---|
| 192.27.95.100 | 53 UDP | 78.957 |
| 192.27.95.80 | 53 UDP | 57.228 |
| 192.33.4.12 | 53 UDP | 42.479 |

If an algorithm is prone to inferring dependencies which are not observable from flow/packet data, the topology can be used to prune those false positives with an algorithm such as in Algorithm 2 below.

Algorithm 2: Topology-Based Dependency Reduction (Element 401 in FIG. 4)

```
reduce_deps(phys_topo, flows)
    svc_groups = find_connected_components(phys_topo)
    flow_groups = { }
    for g in svc_groups:
        for f in flows:
            if f[src]in g or f[dst] in g:
                flow_groups[g] +=f
    return flow_groups
```

One can notify the user/administrator of dependencies that will not be observed given the data and point out where some other method (such as active dependency discovery) may be used to discover dependencies. This is accomplished with Algorithm 3 below.
Algorithm 3: Unobservability Warnings (Element 424 in FIG. 4)

```
warn_unobservables(collection_points, service_locs):
    paths = [ ]
    warning_paths = set( )
    for a in service_locs:
        for b in [x for x in service_locs if x is not a]:
            paths.append(shortest_path(a,b))
        for p in paths:
            if intersection(collection_points,service_locs)is
            empty:
                warning_paths.add(p)
    return warning_paths
```

A known dependency graph can be used to judge the performance of the dependency detection, and the known dependencies can be filtered out to leave only ones that are not known (i.e., known dependency pruning 418). Often times these algorithms generate an overwhelming amount of dependencies with only a few that are of interest that merit further investigation. This is shown in Algorithm 4 below.
Algorithm 4: Known Dependency Pruning (Element 418)

```
prune_deps(known, found_deps):
    for k in known:
        if k in found_deps:
            found_deps.remove(k)
    return found_deps
```

Duplicate flows can be detected (duplicate flow detection 420) in the pre-processing process 402 and better accounted for when the physical network switching topology 412 is known. Otherwise, the main heuristic approach to detect them is based on timing, which itself can be inaccurate. Being able to say definitively that, given a certain physical network switching topology 412, flows between given hosts will be observed twice is much more deterministic and precise. This technique is shown in Algorithm 5 below.
Algorithm 5: Duplicate Flow Detection (Element 420)

```
dupe_flows(phys_topo, collection_pts, dep_graph):
    dups = [ ]
    for a in dep_graph[nodes]:
        for b in (x for x in dep graph if x is not a):
            path = phys_topo.path(a,b)
            if [x for x in path if x in
            collection_pts].len>1:
                dups.add((a,b))
    return dups
```

After this initial dependency detection (i.e., network service dependency detection 416), the algorithm to detect network service profiles (i.e., network service profile detection 422) is executed. The algorithm is inspired by previous notions of flow nesting, but it is extended to arbitrarily many levels of nesting. Other network service detection algorithms are restricted to pairs of services, but a service profile can consist of many services that depend on each other temporally. When only considering pairs, it is not clear what exactly a given dependency from a service is for and, therefore, it is difficult to ascertain how critical it is. With a service profile, it is easy to see if only a few services use a dependency pattern, or if it is very prominent.

Figure 6:
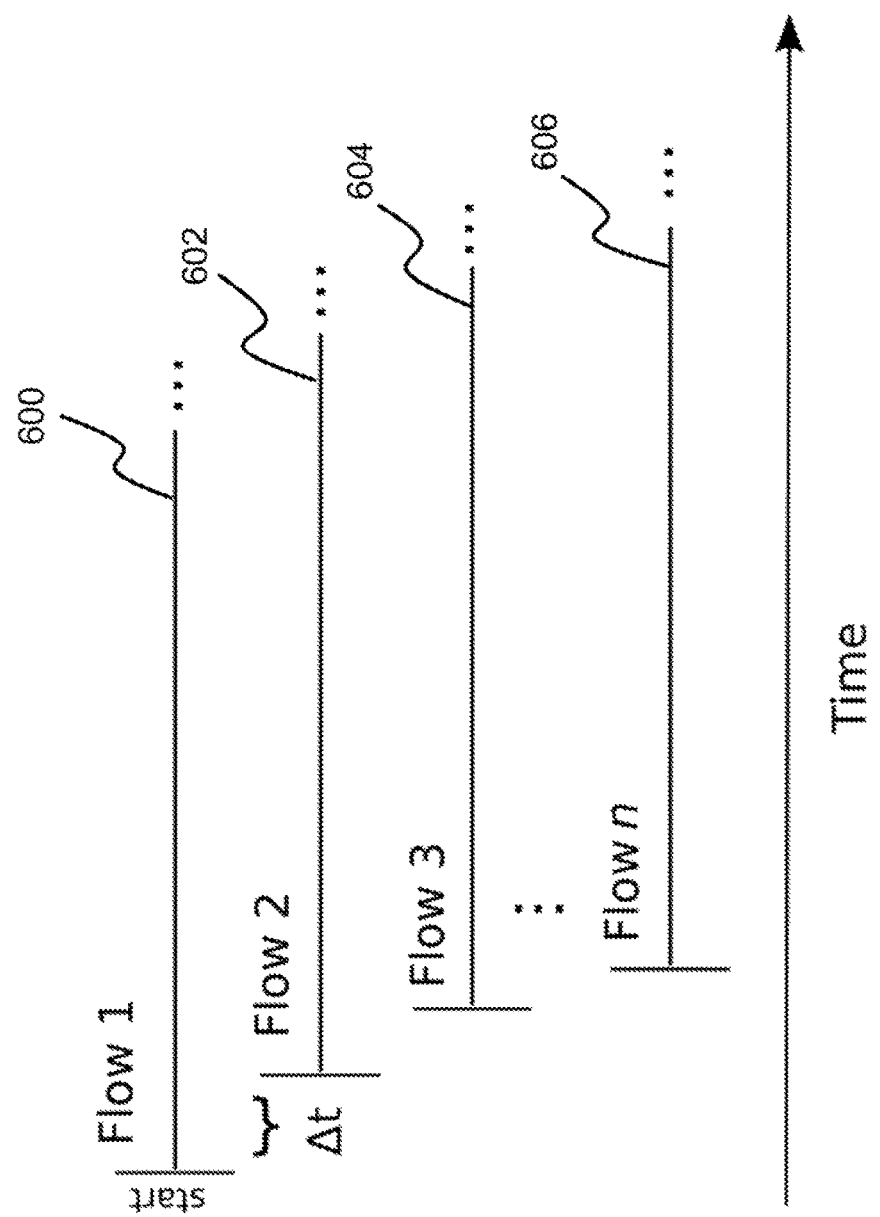
FIG. 6 is an illustration of n-level flow nesting according to embodiments of the present disclosure.

The network service profile detection 422 process functions by first considering all flows that are: short in the length of time they exist (~1 second, tunable parameter) and bi-directional. This approach follows other approaches in pruning flows that are, in all likelihood, irrelevant or hard to determine anything meaningful about. Then, for every qualifying flow, flows that start and end inside of the outer flow are found. That process is repeated on each inner flow, recursively, until no more matches are found. FIG. 6 is an illustration of n-level flow nesting according to the embodiments of this disclosure, depicting a flow 1, element 600; a flow 2, element 602; a flow 3, element 604; and a flow n, element 606. The resulting structure can be regarded as a chain, with the longest flow (flow 1, element 600) on the outside and the shortest (flow n, element 606) on the inside. This structure represents a series of blocking waits in a network service, where the innermost service must return a response before the next can return, and so on. It can also simply represent a coincidence in which an asynchronous network request takes on this form. Not every service profile will exhibit this pattern, but it is often present. This algorithm is presented in pseudocode in Algorithm 6 below.
Algorithm 6: Network Service Profile Detection (Element 422)

```
def re_nest(cur_flow,flow_list, depth):
    matches = [ ]
    for f in flow_list:
    if len(matches)<1:
        return
    else:
        print str (depth)
    #recurse
    ret_chain = [ ]
    if(depth>0): #are we at the max depth?
        #see if our matches have nestings
        ret_chain = map( lambda
        f:re_nest(f,flow_list,depth-1),matches)
    if len(ret_chain) is not 0:
        while None in ret_chain: ret_chain.remove(None)
        if len(ret_chain) is 0: return (cur_flow.sv( ))
        chain = frozenset(ret_chain)
        return (cur_flow.sv( ),chain)
    #hit the actual floor
    else: return (cur_flow.sv( ) frozenset((s.sv( ) for s in
    matches)))
```

The service profiles (detected in element 422) are useful to analyze the dependency structure of the network further, and, given the physical network switching topology 412, they can be used further. Since many service profiles can occur in more than one place, they exhibit some degree of generality. Therefore, if there is a set of dependencies where one end enters an unobservable region and then ends, and another dependency set that starts where the unobservable region ends, it may be possible to use prior service profiles to "stitch" these two sets together to show the true dependency (i.e., missing link inference 426 in FIG. 4). An example of an algorithm that would iterate over given prior service templates is shown below in Algorithm 7.
Algorithm 7: Missing Link Inference (Element 426)

```
def match_templates(inferred_svcs, templates, thresh):
    matches = [ ]
    for t in templates:
        if t.fit(inferred_svcs) > thresh:
            matches[t] = t.fit(inferred_svcs)
    return matches
```

Automated approaches to infer (reverse engineer) network services in operation are an important addition to an administrator's arsenal. Such approaches can also be part of an Intrusion Detection System (IDS). Anywhere network dependency monitoring is being used in a situation in which the network topology and monitoring points are well known, the methods according to the invention described herein could help mitigate blind spots and false negatives that tend to be prevalent with passive methods.

The present invention can aid network administrators in identifying important servers and scheduling maintenance around them. Further, the system according to embodiments of the present disclosure can be utilized to help network administrators provision and manage such networks more effectively.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for inferring network service dependencies, the system comprising:
   one or more processors and a non-transitory computer-readable medium having executable instructions encoded thereon such that when executed, the one or more processors perform operations of:
   performing passive network service dependency detection on a set of network data, the network having a network topology, to detect a set of network service dependencies;
   performing network service profile detection on the set of network data, resulting in a set of network service profiles; and
   using the network topology and the set of network service profiles, mitigating an effect of blind spots in the set of network data.

2. The system as set forth in claim 1, wherein the one or more processors further perform an operation of inferring a plurality of unobservable network service dependencies in the network using the set of network service profiles.

3. The system as set forth in claim 1, wherein the one or more processors further perform an operation of filtering out a plurality of known network service dependencies from the set of network data, leaving unknown network service dependencies.

4. The system as set forth in claim 1, wherein the one or more processors further perform operations of:
   continuously detecting new network service dependencies;
   comparing the new network service dependencies to previously detected network service dependencies; and
   detecting at least one of network attacks and deviations from normal operations of the network.

5. A computer-implemented method for inferring network service dependencies, the computer-implemented method using one or more processors to perform operations of:
   performing passive network service dependency detection on a set of network data, the network having a network topology, to detect a set of network service dependencies;
   performing network service profile detection on the set of network data, resulting in a set of network service profiles; and
   using the network topology and the set of network service profiles, mitigating an effect of blind spots in the set of network data.

6. The method as set forth in claim 5, wherein the one or more processors further perform an operation of inferring a plurality of unobservable network service dependencies in the network using the set of network service profiles.

7. The method as set forth in claim 5, wherein the one or more processors further perform an operation of filtering out a plurality of known network service dependencies from the set of network data, leaving unknown network service dependencies.

8. The method as set forth in claim 5, wherein the one or more processors further perform operations of:
   continuously detecting new network service dependencies;
   comparing the new network service dependencies to previously detected network service dependencies; and
   detecting at least one of network attacks and deviations from normal operations of the network.

9. A computer program product for inferring network service dependencies, the computer program product comprising:
   computer-readable instructions stored on a non-transitory computer-readable medium that are executable by a computer having one or more processors for causing the one or more processors to perform operations of:
   performing passive network service dependency detection on a set of network data, the network having a network topology, to detect a set of network service dependencies;
   performing network service profile detection on the set of network data, resulting in a set of network service profiles; and
   using the network topology and the set of network service profiles, mitigating an effect of blind spots in the set of network data.

10. The computer program product as set forth in claim 9 further comprising instructions for causing the one or more processors to perform an operation of inferring a plurality of unobservable network service dependencies in the network using the set of network service profiles.

11. The computer program product as set forth in claim 9, further comprising instructions for causing the one or more processors to perform an operation of filtering out a plurality of known network service dependencies from the set of network data, leaving unknown network service dependencies.

12. The computer program product as set forth in claim 9, further comprising instructions for causing the one or more processors to perform operations of:
- continuously detecting new network service dependencies;
- comparing the new network service dependencies to previously detected network service dependencies; and
- detecting at least one of network attacks and deviations from normal operations of the network.

* * * * *